US008483099B2

(12) United States Patent
James et al.

(10) Patent No.: US 8,483,099 B2
(45) Date of Patent: Jul. 9, 2013

(54) MICROPHONE EXPANSION UNIT FOR TELECONFERENCE PHONE CALLS

(75) Inventors: Dwayne R. James, Peterborough (CA); William G. O'Farrell, Markham (CA); Arthur G. Ryman, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 11/844,686

(22) Filed: Aug. 24, 2007

(65) Prior Publication Data

US 2009/0052351 A1    Feb. 26, 2009

(51) Int. Cl.
*H04L 12/16*    (2006.01)

(52) U.S. Cl.
USPC ... 370/260; 379/202.01; 455/416; 348/14.08; 709/204

(58) Field of Classification Search
USPC ..... 370/260, 261, 263, 266, 267; 379/202.01; 348/14.08, 14.12; 709/204; 455/416
See application file for complete search history.

(56) References Cited

U.S. PATENT DOCUMENTS

| | | | |
|---|---|---|---|
| 8,368,739 B2 * | 2/2013 | Wilson, Jr. et al. | 348/14.08 |
| 2002/0075941 A1 * | 6/2002 | Souissi et al. | 375/133 |
| 2005/0271194 A1 * | 12/2005 | Woods et al. | 379/202.01 |
| 2005/0286443 A1 * | 12/2005 | McMillen et al. | 370/260 |
| 2007/0050451 A1 * | 3/2007 | Caspi et al. | 709/204 |
| 2007/0264988 A1 * | 11/2007 | Wilson et al. | 455/416 |

* cited by examiner

*Primary Examiner* — Hassan Phillips
*Assistant Examiner* — Ajay Cattungal
(74) *Attorney, Agent, or Firm* — Cantor Colburn LLP; Libby Toub

(57) ABSTRACT

A portable teleconference phone system includes a plurality of portable computers each having a microphone disposed therein, the microphone configured to receive a plurality of analog audio signals from a plurality of users at a first location, the analog audio signals being converted into one of a plurality of digital audio signals at the portable computers; and a portable teleconference unit located at the first location configured to receive the digital audio signals from the portable computers over a wireless link using a Bluetooth communication protocol, the portable teleconference unit configured to multiplex the digital audio signals into a single digital audio signal, convert the single digital audio signal into a single analog audio signal representative of the analog audio signals, and send the single analog audio signal over a communication wire to a remote communication device operated by a plurality of users at a second location forming a teleconference.

2 Claims, 2 Drawing Sheets

MICROPHONE EXPANSION UNIT FOR TELECONFERENCE PHONE CALLS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a portable teleconference phone system, and particularly to a method for forming a teleconference implementing Bluetooth technology in electronic devices having internal microphones.

2. Description of Background

Modern business makes heavy use of voice teleconferencing in order to collaborate with coworkers who are located at other sites. In a typical teleconferencing scenario, several (e.g., 5-15) people gather together in a conference room and around a conferencing system and dial into a teleconference number that remote participants can phone into to hear the proceedings. Unfortunately, the quality of the voice communication is often very poor, especially in larger meetings. Much time is wasted by people asking questions, such as "Can you move closer to the microphone?", "Please repeat that.", "I could not hear what you just said.", "Who's speaking?", etc. Often, the remote participants simply give up.

The standard piece of office equipment used for voice teleconferencing is a speakerphone with an integrated microphone or several satellite mikes. For example, Polycom (see http://polycom.com/home/) makes a popular family of teleconferencing phones. The microphones in those phone systems may be connected to the main phone either by wires or wireless technology. In either case, the participants hear the conversation through speakers, and talk through shared microphones on the conference table. The remote participants experience a quality that is dependent on how close the person speaking is to the microphone. However, the microphones can be costly. Moreover, the number of available microphones is often insufficient to pick up all of the participants, particularly any "soft-spoken" participants around the conference table. Furthermore, for teleconferencing phones that have attachable microphones, the wires extending from the microphones and to the teleconferencing phone system can easily get tangled up when the microphones are passed around the conference table, thereby causing microphones to be disconnected from the teleconferencing phone system.

SUMMARY OF THE INVENTION

The shortcomings of the prior art are overcome and additional advantages are provided through the provision of a portable teleconference phone system, the system comprising: a plurality of portable computers each having a microphone disposed therein, the microphone configured to receive a plurality of analog audio signals from a plurality of users at a first location, each of the plurality of analog audio signals being converted into one of a plurality of digital audio signals at each of the plurality of portable computers; and a portable teleconference unit located at the first location configured to receive the plurality of digital audio signals from the plurality of portable computers over a wireless link using a Bluetooth communication protocol, the portable teleconference unit configured to multiplex the plurality of digital audio signals into a single digital audio signal, convert the single digital audio signal into a single analog audio signal being representative of the plurality of analog audio signals, and send the single analog audio signal over a communication wire to a remote communication device being operated by a plurality of users at a second location forming a teleconference among the plurality of users at the first location and the plurality of users at the second location.

The shortcomings of the prior art are overcome and additional advantages are provided through the provision of a method for forming a teleconference among participants, the method comprising: receiving a plurality of analog audio signals from the plurality of users located at the first location through one of a plurality of microphones correspondingly disposed within one of a plurality of portable computers; converting each of the plurality of analog audio signals into one of a plurality of digital audio signals utilizing the plurality of portable computers; broadcasting each of the plurality of digital audio signals to a portable teleconference unit located at the first location over a wireless link using a Bluetooth communication protocol; multiplexing the plurality of digital audio signals into a single digital audio signal; converting the single digital audio signal into a single analog audio signal, the single analog audio signal being representative of the plurality of analog audio signals; and broadcasting the single analog audio signal over a communication wire to a remote communication device being operated by a plurality of users located at a second location forming the teleconference among the plurality of users at the first location and the plurality of users at the second location.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for forming a teleconference implementing Bluetooth technology in electronic devices having internal microphones.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
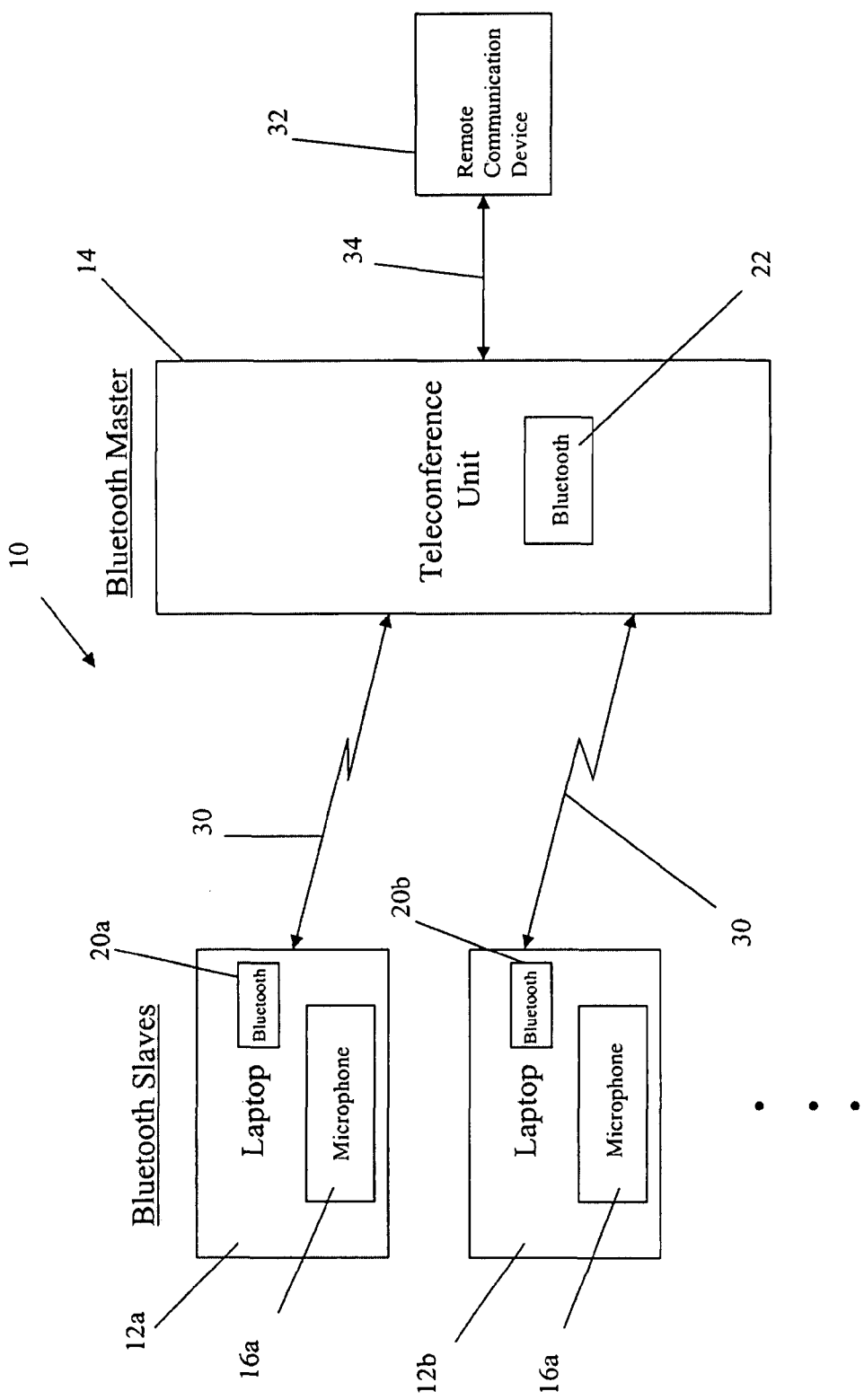
FIG. 1 illustrates an portable teleconference phone system in accordance with one exemplary embodiment of the present invention.
Figure 2:
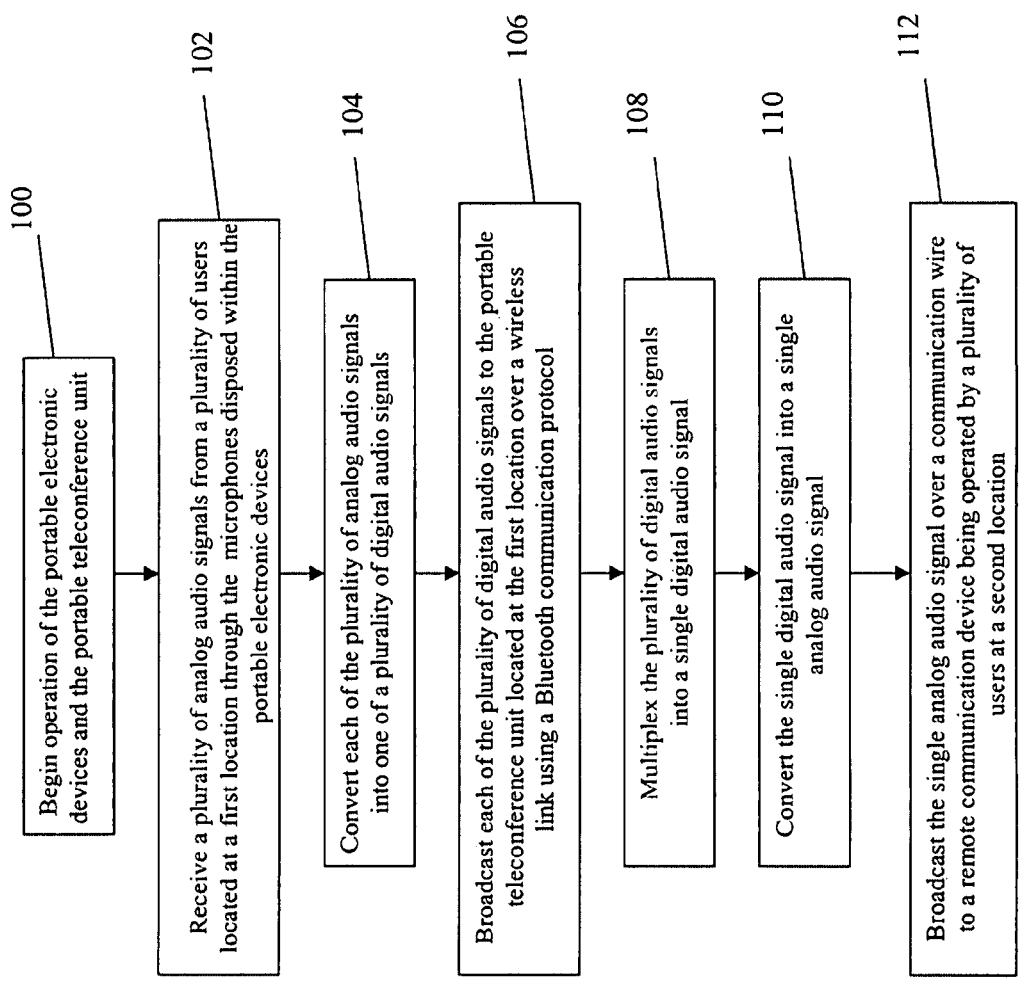
FIG. 2 illustrates a flow-chart diagram that provides a method for forming a teleconference in accordance with one exemplary embodiment of the present invention.

The detailed description explains the preferred embodiments of the invention, together with advantages and features, by way of example with reference to the drawings.

DETAILED DESCRIPTION OF THE INVENTION

Exemplary embodiments of a portable teleconference system and a method of using the same in accordance with the present invention will now be described with reference to the drawings. The exemplary embodiment of a portable teleconference system described herein is configured to receive a plurality of analog audio signals from a plurality of users located at a first location through one of a plurality of microphones correspondingly disposed within one of a plurality of portable computers. The exemplary embodiment of a portable teleconference system described herein is further configured to convert each of a plurality of analog audio signals into one of a plurality of digital audio signals. The exemplary embodiment of a portable teleconference system described herein is further configured to broadcast each of a plurality of digital audio signals to a portable teleconference unit located at a first location over a wireless link using a Bluetooth communication protocol. The exemplary embodiment of a portable teleconference system described herein is further configured to multiplex a plurality of digital audio signals into a signal digital audio signal. The exemplary embodiment of a portable teleconference system described herein is further configured to convert a single digital audio signal into a single analog audio signal where the single analog audio signal is representative of a plurality of analog audio signals. The exemplary embodiment of a portable teleconference system described herein is further configured to broadcast a single analog audio signal over a communication wire to a remote communication device being operated by a plurality of users located at a second location, thereby forming a teleconference among a plurality of users at a first location and the plurality of users at the second location.

The inventors herein have recognized that having a portable teleconference phone system comprising a teleconference unit configured to receive an audio input from a number of electronic devices (e.g., laptops) that have built-in microphones greatly increases microphone reception in a teleconference making it so that each participant with a laptop effectively has their own unique microphone and the remote participants will be able to follow along in a teleconference meeting much more easily. The inventors herein have further recognized that having such a system would permit the user of the laptop to speak at a normal volume, and their voice would be included clearly in the teleconference. As such, there would be no need for participants in the teleconference to shuffle microphones around the conference table prior to speaking, and no fear that their voice would fail to be picked up. Furthermore, the built-in microphone in each laptop would also be sensitive enough to pick up voices of other participants sitting on either side of the laptop, should those participants not have a laptop themselves. Moreover, participants in a teleconference usually bring their laptop computers, which often have Internet access via Wi-Fi (or the laptops may be connected to the Internet via Ethernet cables plugged into table ports) and include a built-in microphone. This eliminates the need to purchase costly microphones as described above.

Referring now to FIG. 1, a portable teleconference phone system 10 in accordance with one exemplary embodiment is provided. The system 10 comprises a plurality of portable electronic or computer devices 12a, 12b (e.g., laptops) in signal communication with a portable teleconference unit 14. For simplistic purposes, only two portable electronic devices 12a, 12b are shown in FIG. 1; however, more than two portable electronic devices may be used in exemplary embodiments of the present invention and should not be limited to the configuration as shown. In one non-limiting embodiment, there are seven portable electronic devices in signal communication with the portable teleconference unit. In one embodiment, each of the portable electronic devices 12a, 12b is in wireless communication with portable teleconference unit 14. The portable electronic devices 12a, 12b each may be any conventional portable laptop with data communication capabilities and wireless capabilities. It is contemplated that the portable electronic devices 12a, 12b may be any conventional Personal Digital Assistances (PDAs) with data communication capabilities, such as a wireless application protocol (WAP) enabled PDA connected to a GSM (Global System for Mobile communications) or UMTS (Universal Mobile Telecommunications System) network. Of course, the portable electronic devices 12a, 12b, may by a combination of a portable laptop and a PDA or otherwise. Furthermore, each of the portable electronic or computer devices 12a, 12b may be any Bluetooth-enabled device having a microphone and/or speaker feature. The teleconference unit 14 may be similar to any conventional teleconference phone used for teleconferences or meetings, such as one from a family of teleconferencing phones sold by Polycom. Of course, other conventional voice solutions for conferencing applications may be used in exemplary embodiments of the present invention and should not be limited to the example set forth above.

The portable electronic devices 12a, 12b are external with respect to the portable teleconference unit 14. Microphones 16a, 16b are included with the portable electronic devices 12a, 12b, respectively, in accordance with one embodiment. The microphones 16a, 16b are configured to receive audio signals or analog audio signals from participants operating the portable electronic devices 12a, 12b. In other words, participants operating the portable electronic devices 12a, 12b can speak into the microphones of the devices. In one embodiment, each of the microphones 16a, 16b for each of the respective portable electronic devices 12a, 12b is internally built-in or disposed within each of the portable electronic devices 12a, 12b. In an alternative embodiment, each of the microphones 16a, 16b for each of the respective portable electronic devices 12a, 12b is a separate piece or component from their respective devices. In this alternative embodiment, each of the portable electronic devices 12a, 12b is configured to receive the microphones 16a, 16b respectively via a Universal Serial Bus (USB) connection in accordance with one non-limiting embodiment. Of course, other configurations for correspondingly connecting each of the microphones 16a, 16b to each of the portable electronic devices 12a, 12b can be used in other embodiments of the present invention and should not be limited to the configuration as shown. In one embodiment, the microphones 16a, 16b are conventional microphones installed in current electronic devices, such as laptops.

In accordance with one embodiment, the portable electronic devices 12a, 12b and the portable teleconference unit 14 communicate with each other, typically via conventional Bluetooth modules 20a, 20b, 22 with transceivers respectively disposed therein using an internationally accepted wireless communication protocol such as Bluetooth™, http://www.motorola.com/bluetooth/actopmactopm/html, consequently providing for Bluetooth-enabled devices. In other words, the module 20a of portable electronic device 12a and the module 22 of teleconference unit 14 allow portable electronic device 12a to wirelessly communicate with portable teleconference unit 14. Similarly, the module 20b of portable electronic device 12b and the module 22 of teleconference unit 14 allow portable electronic device 12b to wirelessly communicate with portable teleconference unit 14. The portable electronic devices 12a, 12b may communicate with and/or pass audio signals to/from portable teleconference unit 14 via a communication link 30 established by Bluetooth modules 20a, 20b, 22. In one exemplary embodiment, the communication link 30 is a wireless link, such as a radio link. As such, audio signals may be broadcasted wirelessly between portable electronic devices 12a, 12b and teleconference unit 14 via Bluetooth radio.

It should be understood that portable telephone unit 14 can include more than one Bluetooth module in accordance with exemplary embodiments of the present invention and should not be limited to the configuration as shown.

In accordance with one embodiment, the teleconference unit 14 having Bluetooth capabilities acts as a Bluetooth master while the portable electronic devices 12a, 12b also having Bluetooth capabilities as described above each act as a Bluetooth slave. As such, the teleconference unit 14 being the Bluetooth master having one or more Bluetooth modules can host one or more personal area networks (PAN) or piconets respectively, where each piconet is capable of supporting at least seven portable electronic devices. In one non-limiting embodiment, seven portable electronic devices are in wireless communication with the portable teleconference unit 14. Of course, more or less than seven portable electronic devices can be in wireless communication with the teleconference unit 14 in exemplary embodiments of the present invention.

In accordance with one embodiment, the portable electronic devices 12a, 12b employ a teleconference application or a VoIP (Voice over Internet Protocol) application, such as a Skype (see http://www.skype.com/) to call a teleconference number, which establishes communication with the portable teleconference unit 14 having a software interface (not shown) configured for accepting the call, and consequently establishing communication with the portable electronic devices 12a, 12b. Of course, other conventional teleconference applications can be used to establish communication between the portable electronic devices 12a, 12b and the teleconference unit 14.

In accordance with one embodiment, each of the portable electronic devices 12a, 12b includes a signal-converting device (not shown), such as an analog-to-digital converter (ADC) for converting the analog audio signals being received by the microphones 16a, 16b to digital audio signals. The digital audio signals are broadcasted via the communication link 30 to portable teleconference unit 14 where the digital audio signals are acquired by the software interface of portable teleconference unit 14. In one embodiment, the digital audio signals acquired by portable teleconference unit 14 are multiplex or combined into a single digital audio signal by a multiplexer (not shown). The multiplexer may be any conventional multiplexer for combining multiple signals into a single signal. In one embodiment, the multiplexer is disposed within portable teleconference unit 14. In an alternative embodiment, the multiplexer is separate from portable teleconference unit 14.

In accordance with one embodiment, the system further includes a remote communication device 32 (e.g., another teleconference unit) in signal communication with teleconference unit 14. The teleconference unit 14 communicates with the remote communication device 32 via a telephone wire 34. The wire 34 may be any conventional telephone cable used in standard telephony applications, which in turn is connected to conventional telephone lines. In one embodiment, the teleconference unit 14 includes a signal-converting device (not shown), such as a digital-to-analog converter (DAC) for converting the single digital audio signal into a single analog audio signal representative of the analog audio signals received by microphones 16a, 16b of portable electronic devices 12a, 12b respectively. The teleconference unit 14 is configured to broadcast the single analog audio signal via telephone wire 34 to remote communication device 32.

Consequently, participants operating portable electronic devices 12a, 12b can communicate with the participant(s) operating the remote communication device 32, thus forming a teleconference among the participants operating portable electronic device 12a, 12b and the participant(s) operating the remote communication device 32. In one embodiment, the portable electronic devices 12a, 12b and portable teleconference unit 14 are located at a first location while the remote communication device 32 is located at a second location distant from the first location.

In accordance with an exemplary embodiment, the participant(s) located at the second location can similarly call the teleconference number to establish communication with the portable teleconference unit 14 through remote communication device 32 using a teleconference application as described above. As such, the participants from the first location and participants from the second location can both connect to or dial into the portable teleconference unit 14 to participate in the teleconference.

In accordance with an exemplary embodiment of the present invention, an exemplary method for forming a teleconference is provided. In this exemplary method, begin operation of the portable electronic devices and the teleconference unit at block 100. In doing so, the respective Bluetooth modules of the portable electronic devices and the teleconference unit are initialized, thus establishing a wireless link for enabling wireless communication between the electronic devices and the teleconference unit. Then, receive a plurality of analog audio signals from a plurality of users located at a first location through the microphones disposed within the portable electronic devices 12a, 12b respectively at block 102. In other words, users may speak into the microphones once Bluetooth connection has been established. Next, covert each of the plurality of analog audio signals into one of a plurality of digital audio signals at block 104. In one embodiment, this is accomplished through a signal-converting device, such as an ADC as described above. At block 106, broadcast each of the plurality of digital audio signals to the portable teleconference unit located at the first location over a wireless link using a Bluetooth communication protocol. Then, multiplex the plurality of digital audio signals into a single digital audio signal at block 108. This is accomplished through a multiplexer in the teleconference unit in accordance with one embodiment. Next, convert the single digital audio signal into a single analog audio signal at block 110. The single analog audio signal is representative of the plurality of analog audio signal sampled from the microphones. At block 112, broadcast the single analog audio signal over the communication wire to the remote communication device being operated by a plurality of users at a second location. Consequently, the teleconference is formed among the plurality of users at the first location and the plurality of users at the second location.

Although only a description of communication flow from the electronic devices to the teleconference unit has been described above, it should be understood that the electronic devices may also receive audio signals originating from the users operating the remote communication device. In one embodiment, each of the electronic devices each includes a speaker for broadcasting audio signals originating from the users operating the remote communication device. In one embodiment, the teleconference unit includes speakers extending therefrom for broadcasting audio signals originating from the users operating the remote communication device. As such, users at the first location operating the electronic devices can hear or listen to the users at the second location operating the remote communication device via the speakers from the electronic devices, the speakers from the teleconference unit or both. It is contemplated that the portable devices include a separate headset having an earphone, which receives the audio signals from the remote users. As such, the noise level in the room can be reduced.

It should be understood that the analog audio signals and the digital audio signals described above may be combined into a single signal at any time during the communication flow and should not be limited to the configuration above. Further more, the single analog audio signal and the single digital audio signal may be split into a number of analog audio signals and a number of digital audio signals respectively at any time during the communication flow and should not be limited to the configuration above.

Although only a description of two locations being involved in the teleconference is described above, it should be understood that more than two locations may be involved in the teleconference and several other locations may listen in on the teleconference in accordance with exemplary embodiments of the present invention.

Advantageously, the present invention improves the quality of voice teleconferencing and results in greater productivity, higher satisfaction, reduced overhead, and reduced travel costs. The present invention as described above gathers audio inputs from external microphone-enabled devices (e.g., laptops) and broadcasts the audio into an existing teleconference phone unit, which sends the combined signal out and over the phone line. In doing so, most participants having laptops with built-in microphones and speaker phones can participate in the teleconference effectively in a normal volume. This eliminates the need to obtain costly microphones that easily can get tangled up around the conference table.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A portable teleconference phone system, comprising:
a first laptop computer having a first built-in microphone, first speakers, and a first slave Bluetooth module internally disposed therein;
a second laptop computer having a second built-in microphone, second speakers, and a second slave Bluetooth module internally disposed therein;
a third laptop computer having a third built-in microphone, third speakers, and a third slave Bluetooth module internally disposed therein, the first, the second, and the third built-in microphones configured to receive a plurality of analog audio signals from a plurality of users at a first location, each of the plurality of analog audio signals being converted into one of a plurality of digital audio signals at each of the first laptop computer, the second laptop computer, and the third laptop computer;
wherein the first slave Bluetooth module, the second slave Bluetooth module, and the third slave Bluetooth module are configured for enabling wireless communication between the first laptop computer, the second laptop computer, and the third laptop computer and the portable teleconference unit; and
the portable teleconference unit located at the first location configured to receive the plurality of digital audio signals from the first laptop computer, the second laptop computer, and the third laptop computer over a wireless link using a Bluetooth communication protocol, the portable teleconference unit configured to multiplex the plurality of digital audio signals into a single digital audio signal, convert the single audio signal into a single analog audio signal being representative of the plurality of analog audio signals, and send the single analog audio signal over a communication wire to a remote communication device being operated by a plurality of users at a second location forming a teleconference among the plurality of users at the first location and the plurality of users at the second location;
wherein the portable teleconference unit includes a master Bluetooth module configured for hosting at least one piconet and establishing the wireless link for enabling wireless communication between each of the first laptop computer, the second laptop computer, and the third laptop computer and the portable teleconference unit, the at least one piconet configured to support at least seven of the plurality of users at the first location;
wherein the first laptop computer, the second laptop computer, and the third laptop computer are distinct.

2. The system as in claim 1, wherein the first laptop computer is for a first participant and the first built-in microphone picks up a voice of the first participant;
wherein the second laptop computer is for a second participant and the second built-in microphone picks up a voice of the second participant; and
wherein the third laptop computer is for a third participant and third built-in microphone picks up a voice of the third participant.

* * * * *